US010180978B2

(12) United States Patent
Shapiro et al.

(10) Patent No.: US 10,180,978 B2
(45) Date of Patent: Jan. 15, 2019

(54) INTERFACE PROVIDING DECISION SUPPORT IN COMPLEX PROBLEM ENVIRONMENT

(71) Applicants: Vladimir Shapiro, Sinsheim (DE); Jochen Steinbach, Bad Schoenborn (DE); Douglas Whelton Muise, Brooklyn, NY (US)

(72) Inventors: Vladimir Shapiro, Sinsheim (DE); Jochen Steinbach, Bad Schoenborn (DE); Douglas Whelton Muise, Brooklyn, NY (US)

(73) Assignee: SAP SE, Walldorf (DE)

( * ) Notice: Subject to any disclaimer, the term of this patent is extended or adjusted under 35 U.S.C. 154(b) by 637 days.

(21) Appl. No.: 14/663,011

(22) Filed: Mar. 19, 2015

(65) Prior Publication Data

US 2016/0275176 A1  Sep. 22, 2016

(51) Int. Cl.
   *G06F 17/30* (2006.01)
   *G06F 3/0484* (2013.01)
   *G06F 3/0481* (2013.01)
   *G06F 3/0482* (2013.01)
   (Continued)

(52) U.S. Cl.
   CPC ...... *G06F 17/30604* (2013.01); *G06F 3/0482* (2013.01); *G06F 3/04817* (2013.01); *G06F 3/04842* (2013.01); *G06F 8/34* (2013.01); *G06F 17/30327* (2013.01); *G06F 17/30395* (2013.01); *G06F 17/30572* (2013.01); *G06Q 10/06* (2013.01)

(58) Field of Classification Search
   CPC ......... G06F 17/30604; G06F 17/30327; G06F 17/30395; G06F 17/30572; G06F 3/04817; G06F 3/0482
   USPC ....................................................... 707/736
   See application file for complete search history.

(56) References Cited

U.S. PATENT DOCUMENTS

| 2004/0139095 A1* | 7/2004 | Trastour et al. .............. 707/100 |
| 2012/0072282 A1* | 3/2012 | Leigh et al. ................ 705/14.49 |
| 2014/0109015 A1* | 4/2014 | Farn ............................. 715/854 |

(Continued)

*Primary Examiner* — Jean B Fleurantin
(74) *Attorney, Agent, or Firm* — Fountainhead Law Group P.C.

(57) ABSTRACT

An interface provides decision support in complex problem environments. An interface engine selectively communicates with a database to display (e.g., in tree form) proposed decisions and various corresponding outcomes resulting from cause-effect relationships of selected decisions. Structured data objects store state information (e.g., current/projected/target) of multi-faceted, inter-connected entities. Object metadata can include entity attributes and/or entity relationship details. The interface allows traversing the tree to explore the cause-effect relationships and/or validate various solution paths. The tree (including the proposed decisions, outcomes, and solution paths) may be initially generated up front, based upon particular problem scenario characteristics. Limited subsequent interaction between the interface engine and the underlying backend data store may enhance speed/performance/user experience. Roundtrip interaction with the underlying database may take place where a user seeks to adjust a decision with specific metrics and simulate the result, and/or create an execution plan/activity based upon a solution path previously designed.

11 Claims, 7 Drawing Sheets

(51) Int. Cl.
*G06Q 10/06* (2012.01)
*G06F 8/34* (2018.01)

(56) References Cited

U.S. PATENT DOCUMENTS

| | | | |
|---|---|---|---|
| 2015/0074069 A1* | 3/2015 | Baeuerle et al. | 707/702 |
| 2015/0324360 A1* | 11/2015 | Dakshinamurthy | G06F 17/30864 707/728 |
| 2016/0246756 A1* | 8/2016 | Petkov | 708/446 |
| 2016/0283848 A1* | 9/2016 | Kozloski | G06N 5/043 |

* cited by examiner

INTERFACE PROVIDING DECISION SUPPORT IN COMPLEX PROBLEM ENVIRONMENT

BACKGROUND OF THE INVENTION

Unless otherwise indicated herein, the approaches described in this section are not prior art to the claims in this application and are not admitted to be prior art by inclusion in this section.

Embodiments relate to computer user interfaces, and in particular, to user interfaces providing decision support in complex problem environments. Specifically, an individual working to solve a business problem may often seek to perform tasks such as investigating extended cause-and-effect relationships, gathering context-related information, and/or comparing and validating possible solution paths.

For example in an in-house production scenario, a material planner (MRP Controller Role) may face complex problems affecting different finished end products, intermediates, and/or starting materials. To address shortages, the ERP planner may seek to explore different possible opportunities available both within and outside of a particular business entity. Examples of such options can include but are not limited to, rescheduling of production orders, creating new supplies, and collaborating with a purchaser.

Conventionally, the material planner may be forced to manually validate and compare the various problem solution options in terms of feasibility and possible consequences (e.g. follow-up problems on the component level or capacity issues). This process of evaluating options can be roughly compared with a chess game, where the player considers a next move and tries to calculate (simulate) its consequences mentally.

In attempting to manually perform this evaluation, the material planner may lack an overview of the context of the problem, and also the cause-and-effect relationships of the possible options. Typically, the material planner may be forced to gather the related information by hand, navigating step-by-step through several levels of details involving the creation of off-line notes and extra communication that may not be recorded or reproducible.

A lack of transparency/reproducibility during such critical decision making processes, may leads to inefficiency/time loss, mental stress, and degradation of overall productivity. Also, the lack of an established procedure may lead to potentially suboptimal or even incorrect decisions being made.

BRIEF SUMMARY OF THE INVENTION

An interface provides decision support in complex problem environments. An interface engine selectively communicates with an underlying database to display (e.g., in the form of a tree) proposed decisions, as well as various outcomes of the complex cause-effect relationships resulting from selected decisions. Structured objects of the database store information pertaining to states (e.g., current, projected, target) of a plurality of multi-faceted, inter-connected entities. Metadata in the data objects may include various entity attributes and/or entity relationship details.

The interface allows a user to traverse the tree to explore the cause-effect relationships and/or validate various solution paths. In certain embodiments the tree (including proposed decisions and corresponding solution paths) may be generated up front, based upon characteristics of an initial problem scenario. Limited subsequent interaction between the interface engine and the underlying backend database store may serve to enhance speed, performance, and the user's experience.

According to particular embodiments, roundtrip interaction with the underlying database may take place where a user seeks to adjust a decision with specific metrics and simulate the result. Roundtrip interaction between the interface engine and the underlying database may also occur when the user wants to create an execution plan/activity that is based upon a solution path designed during previous exploration efforts.

The user provides input to the engine in the form of selecting decisions affecting entity state. Changes in one entity are in turn propagated to determine the states of other related entities.

The interface provides an updated view reflecting deviation in entity state from a target. The user may then provide further input in the form of selecting follow-up decisions seeking to conform the states of the decision-implicated entities to their respective targets.

Embodiments may display successive decisions and resulting entity states in a tree (e.g., horizontal) format. A length of the tree may reflect temporal aspects of the decision-making process.

An embodiment of a computer-implemented method comprises providing an engine in communication with a database comprising state information of a first entity that is related to a second entity. The engine displays a state of the first entity. The engine receives an input changing the state of the first entity. The engine processes the input to change a state of the second entity, and the engine displays the changed state of the second entity.

A non-transitory computer readable storage medium embodies a computer program for performing a method comprising providing an engine in communication with a database to display state information of a first entity that is related to a second entity. The engine receives an input changing the state of the first entity. The engine processes the input to change a state of the second entity. The engine displays the changed state of the second entity.

A computer system according to an embodiment comprises one or more processors and a software program executable on said computer system. The software program is configured to cause an engine to be in communication with a database to display state information of a first entity that is related to a second entity, the state information displayed as a first node of a horizontal tree. The software program is further configured to cause the engine to receive an input changing the state of the first entity, and to cause the engine to process the input to change a state of the second entity. The software program is further configured to cause the engine to display the changed state of the second entity as a second node in a tree.

Certain embodiments further comprise the engine displaying a decision, wherein the input comprises selecting the decision.

In some embodiments the state of the first entity, the decision, and the changed state of the second entity are displayed as nodes of a tree.

According to particular embodiments the tree may be horizontal.

In various embodiments the state of the first entity is displayed in a first column, the decision and an alternative decision are displayed in a second column to the right of the first column, and the changed state of the second entity and an updated state of the first entity are displayed in a third column to the right of the second column.

Certain embodiments may further comprise displaying the decision with an icon.

Some embodiments may further comprise displaying details relevant to the decision in a panel.

According to particular embodiments the information is stored as a database data object comprising metadata including an attribute of the first entity.

In various embodiments the information is stored as a database data object comprising metadata including a relationship between the first entity and the second entity.

The following detailed description and accompanying drawings provide a better understanding of the nature and advantages of embodiments.

DETAILED DESCRIPTION

Described herein are techniques for providing decision support according to an embodiment. In the following description, for purposes of explanation, numerous examples and specific details are set forth in order to provide a thorough understanding of the present invention. It will be evident, however, to one skilled in the art that embodiments of the present invention as defined by the claims may include some or all of the features in these examples alone or in combination with other features described below, and may further include modifications and equivalents of the features and concepts described herein.

Figure 1:
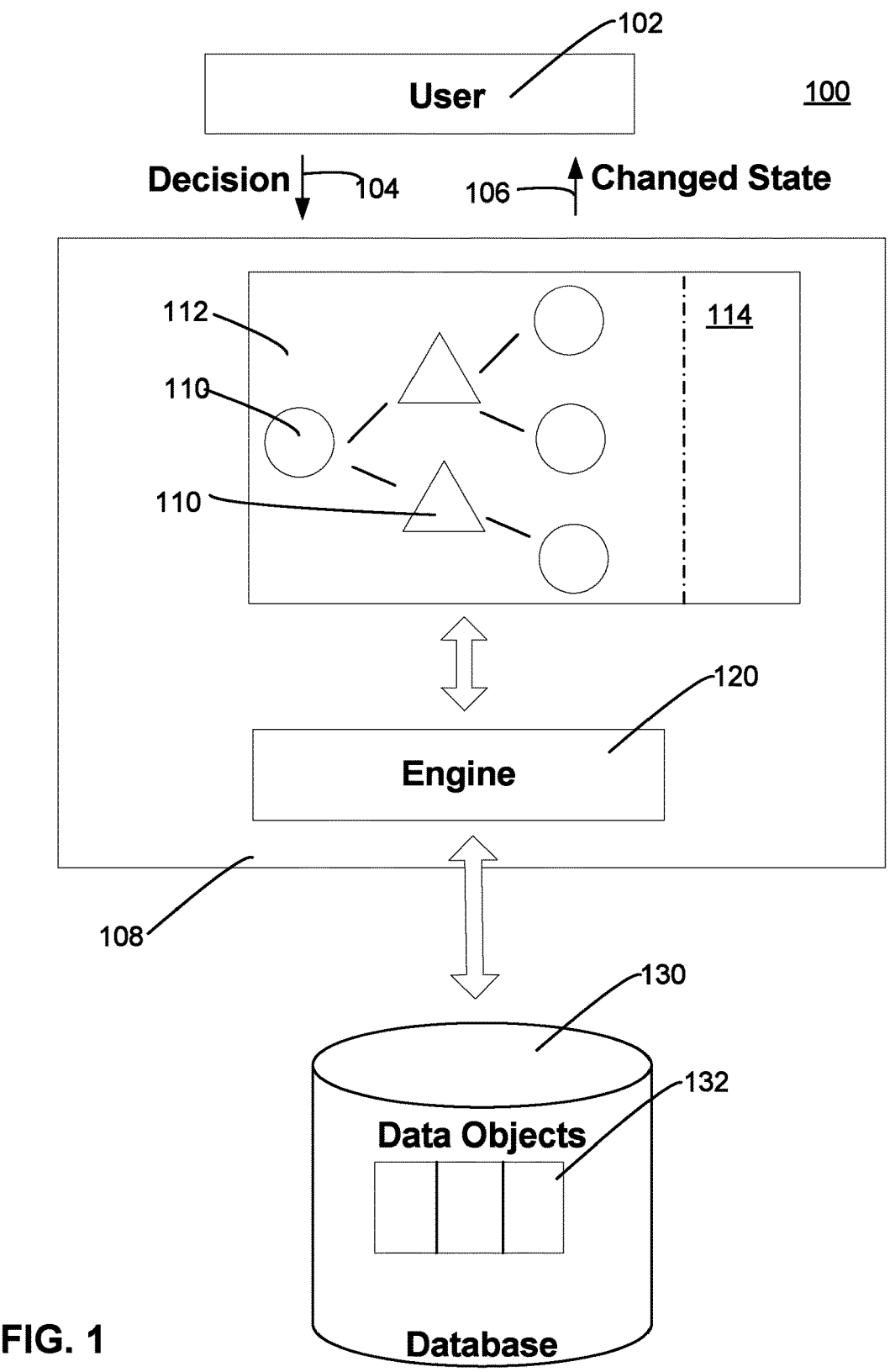
FIG. 1 is a simplified view of an embodiment of a system configured to perform decision support.

FIG. 1 is a simplified view of a system 100 according to an embodiment that is configured to perform decision support. Specifically, a user 102 is configured to provide inputs 104 to, and receive outputs 106 from, an interface system 108.

In one embodiment, user inputs may be provided through symbols 110 that are accessed and manipulated on a display 112 of the interface. As described below in connection with FIG. 2, these symbols (e.g., circles) may reflect states of a plurality of entities, each comprising one or more attributes. The states of the entities depicted by the interface may be current (e.g., present), future (e.g., projections), and/or idealized (e.g., targets). Other symbols (e.g., triangles) may depict events affecting the states of entities, for example decisions.

The interface further comprises an engine 120. The engine is configured to receive the user inputs, and in response refer to data contained in an underlying database 130.

Data in the database may comprise one or more data objects 132 describing the plurality of entities, and the various attributes thereof. The organized structure of the database, including data objects reflecting relationships between entities and/or their attributes, may render the data objects particularly suited for this purpose.

Based upon the user inputs and the data within the database, the engine may generate a changed state of one or more of a plurality of entities. Such states may be determined based upon user input in the form of decisions affecting an entity state.

Embodiments provide an interface such as a tree, and allow the user to traverse the tree and explore the relationships on the frontend, without necessarily having to go back to the database each time. That is, some/all user interactions with the interface may or may not trigger a roundtrip communication with the underlying database, depending upon the particular embodiment. This characteristic can depend on the actual implementation and factors such as the effort involved to initially calculate the complete tree.

Embodiments enforcing limited selective communication between the interface and the underlying database to not require reference back to the underlying database for each decision exploration/analysis, can improve speed and result in an enhanced user experience.

According to some embodiments, a roundtrip interaction with the database may occur where a user seeks to adjust a decision with tailored metrics and simulate the consequences of that decision. Roundtrip interaction with the underlying database may also take place where a user wishes to create an execution plan/activity based on a solution path that has been previously designed during the exploration phase.

The engine may generate an output in the form of an updated display. That display reflects changed states according to inputs by the user (e.g., decisions made). Although not shown in the highly simplified view of FIG. 1, lengthy chains of states/decisions/states/decisions etc. may be displayed in a variety of ways by the interface. Examples of such visualizations of cause-and-effect relationships constituting decision various decision paths, can include trees (e.g., oriented horizontally and/or vertically), a forced centered graph, or others.

As further described below, a display according to embodiments may further include other than symbols arranged in a tree format, for example a panel 114 including text, icons, fields, etc.

Figure 2:
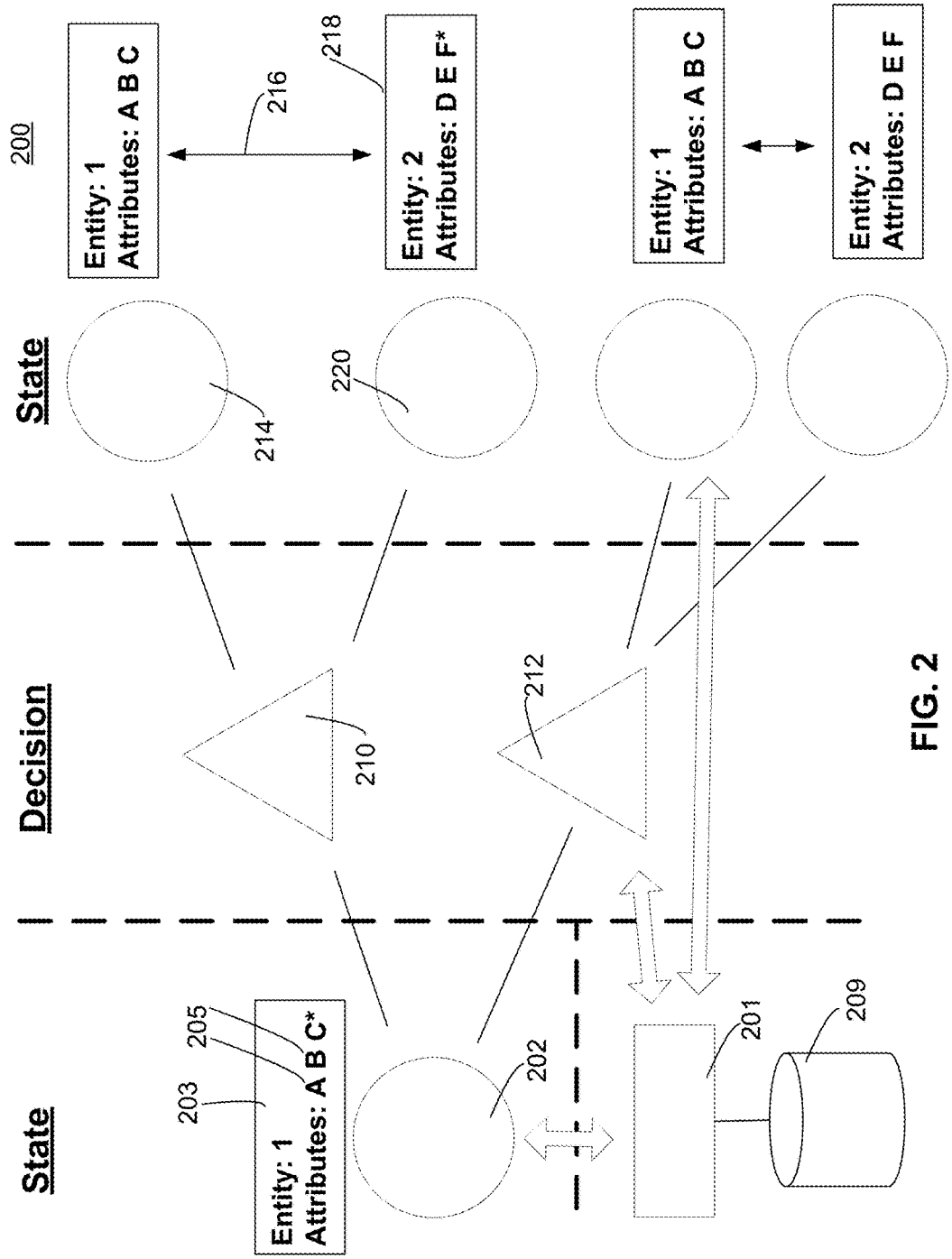
FIG. 2 is a schematic view of an interface providing decision support according to an embodiment.

FIG. 2 shows a schematic view of the interface display and its interaction with an engine 201 and database 209. In particular, the display 200 may comprise a current state depicted by the circle 202, of a first entity 203.

Entity 203 comprises three attributes 205 A, B, C. The current state of the first entity may deviate from a desired target state according to one or more particulars.

For example as indicated by the asterix (*) appearing beside attribute C of the first entity, that attribute may deviate from an ideal condition. Thus in an example, the first entity may comprise a product order, with attribute C representing an insufficient number of a particular component being available to meet that product order.

This deviation in the current state of the first entity from an ideal target state (e.g., component shortage), represents a problem to be solved by the user. In response to this problem, the user may seek to implement a solution bringing the current state into conformity with the desired target state.

Accordingly, the interface may display two possible decisions 210 and 212 that a user may explore in attempting to solve the problem. While the particular embodiment of FIG. 2 shows two possible decisions, this is only an example and the interface is not limited to showing any particular number of decisions.

Decision 210 may allow the user to borrow existing parts that are available, from another purchase order, thereby redressing the shortage. Thus, making first decision 210 may solve the initial problem, creating a new state 214 that brings attribute C of the first entity into conformity with a desired target state.

Importantly, however, embodiments recognize a complex set of relationships 216 conformity between different entities and their respective attributes. These relationships may be expressed in the form of linkages between data objects in an underlying database.

Accordingly, FIG. 2 shows that consequence of making the decision 210, is a change in the state of a second entity 218 that is related in some manner to the first entity.

In particular, the second entity comprises three attributes D, E, and F. FIG. 2 shows that implementing the decision 218, results in a deviation from ideal, of the state 220 of that second entity. In particular, the value of attribute F is changed from the target (again reflected here by an asterix). In a simplified example, the new state 220 may reflect creation of a new problem, namely a shortage of parts for another purchase order (the second entity).

In this manner, the engine processes the user's input decision according to the existing linkages expressed in the underlying database structure. The engine accordingly causes the interface to display this changed state of the first entity resulting from the decision. Accordingly, the user is informed in an intuitive way, of the consequences (both positive and negative) implicated in making the decision 210 to solve the initial problem.

The interface display 200, however, may also afford the user with the ability to make a different decision 212 to address the original problem. For example, the user could re-schedule the product order to such a time as sufficient components are available. This option addresses the problem, without affecting the second entity (purchase order).

As shown in FIG. 2, implementing the decision 212 allows the first entity to achieve the target state, without disturbing a state of other related entities from desired target states. The problem is solved, with the interface assisting the user to work through the issue in an intuitive and reproducible manner.

Figure 3:
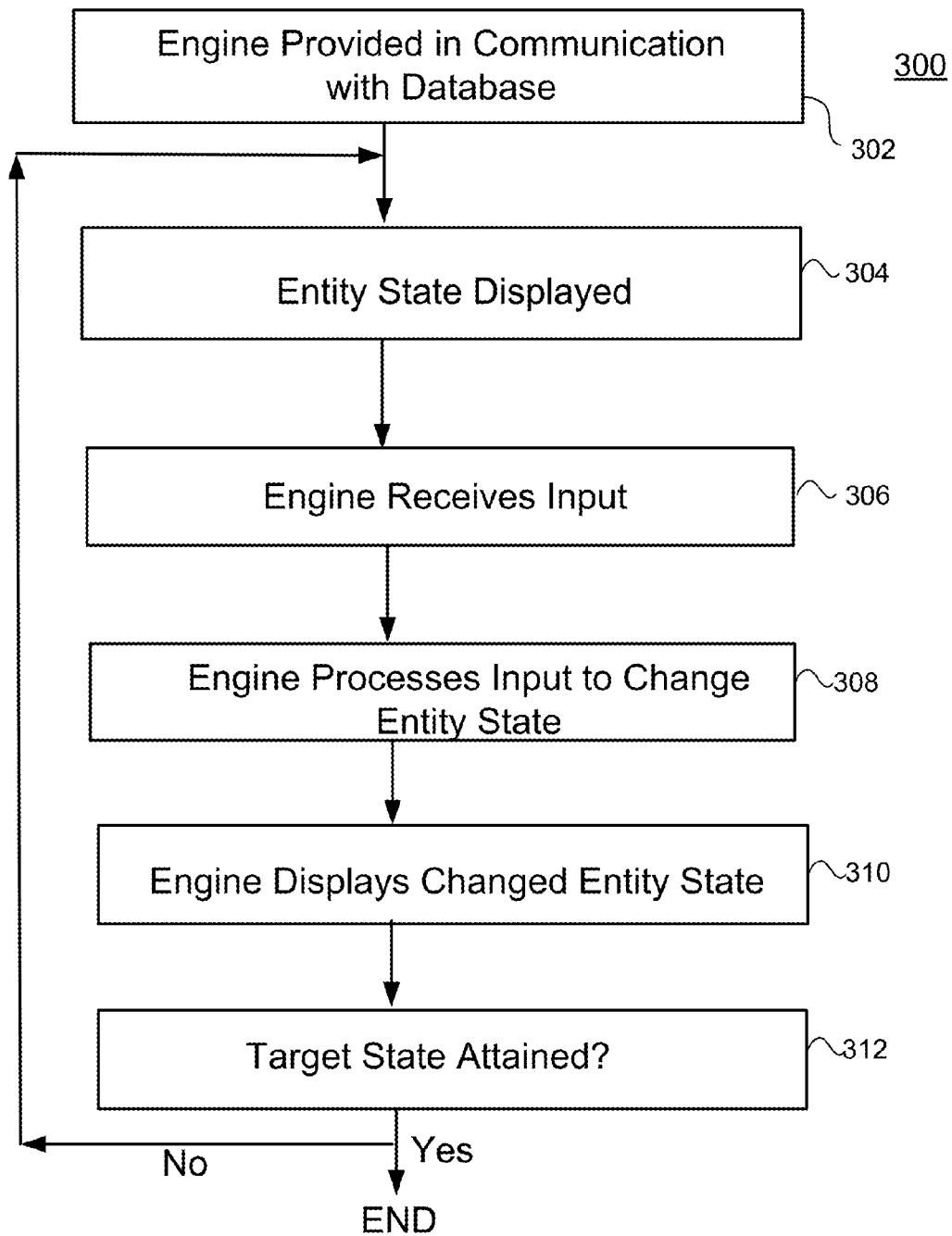
FIG. 3 is a simplified flow diagram of a process according to an embodiment.

FIG. 3 is a simplified flow diagram of a process 300 according to an embodiment. In a first step 302, an engine is provided in communication with a database storing data regarding a current state of a first entity related to a second entity.

In a second step 304, the engine displays a current state of the first entity. In a third step 306, the engine receives an input corresponding to a changed state of the first entity.

In a fourth step 308, the engine calculates a new state of the second entity from the input. In a fifth step 310, the engine displays the new state of the second entity.

In sixth step 312, the engine determines whether all entities have attained their respective target state. When all entities have achieved their target state, the process concludes. Otherwise, if at least some entities have not achieved their target state, the process flow returns to step 304 in order to display current entity state, and the process may begin anew.

Further details regarding decision support are now provided in connection with the following specific example.

Example

One instance of an interface providing decision support according to an embodiment, is now presented in the context of materials resource planning (MRP) in a manufacturing environment. Here, the user is a MRP planner for in-house production.

Figure 4A:
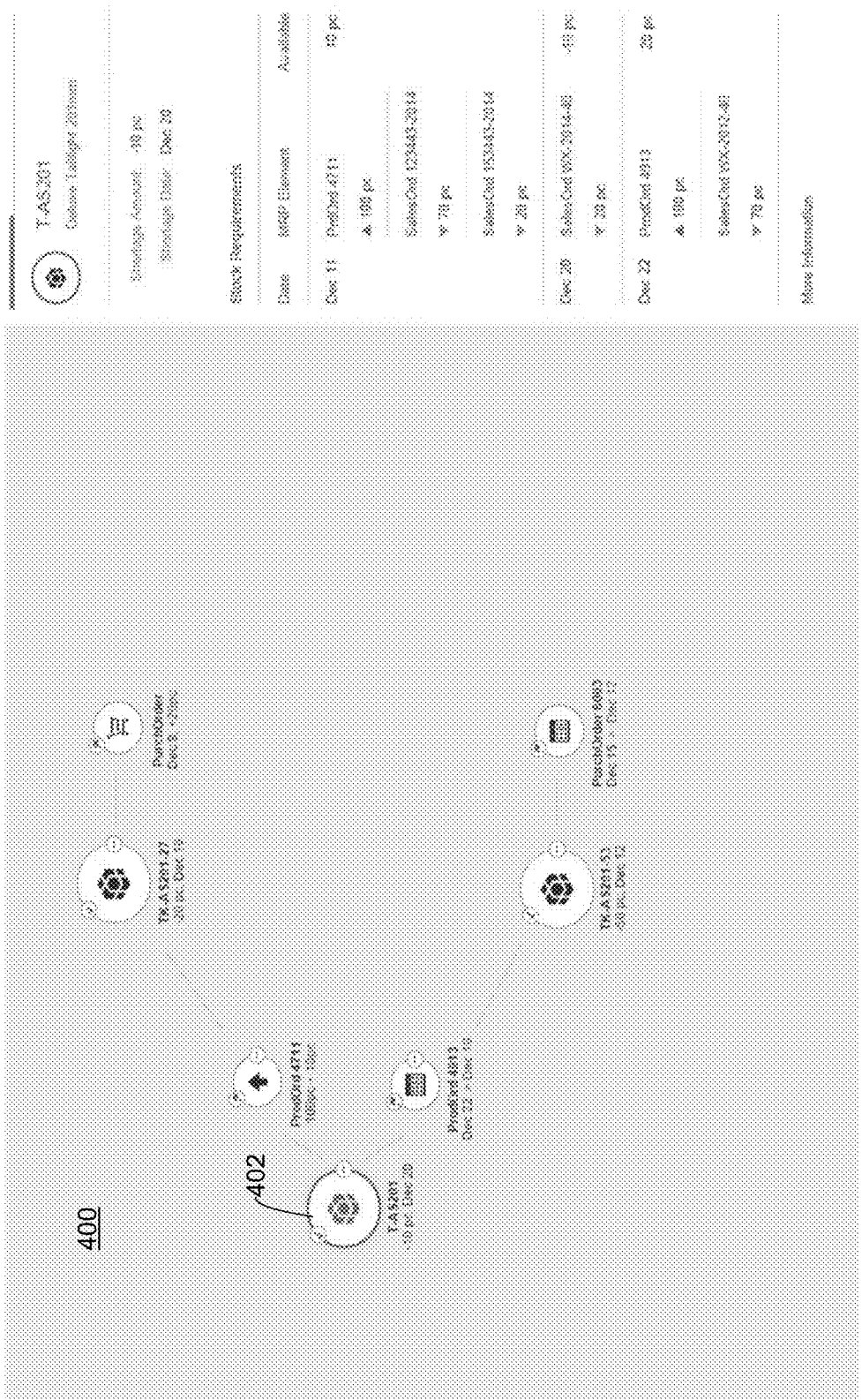
FIGS. 4A-4B are sample screen shots of an interface for decision support according to an embodiment.

The user checks the MRP system and is presented with an interface 400 display as shown in FIG. 4A. In this particular interface, states are represented by larger circles enclosing an icon, and decisions are represented by smaller circles enclosing an icon.

The user may click on the circle 402 representing a state of the Material T-AS201, corresponding to a finished, Deluxe Taillight product of size 201 mm. This user interaction with the interface reveals a shortage of 10 pieces of the material T-AS201 as of December 20.

To explore possible solutions to this shortage, the user accesses the system. Possible solutions are proposed by the system on the first level. Consequences are pre-calculated and delivered by the system once the user expands one or another path.

In particular, FIG. 4A shows two decision proposals which could potentially redress the issue. A first decision would be to procure additional T-AS201 taillights prior to December 20. This decision is illustrated in the upper branch of FIGS. 4A-4B.

The system shows that an existing product order (ProdOrd) 4711 of 100 pieces, is due to be delivered on December 11. So, one possible solution to the shortage would be to divert from the ProdOrd 4711, 10 pieces of the T-AS201 product to meet the shortage.

FIG. 4A shows the new state resulting from implementation of such a procurement decision. In particular, this shifting of resources would result in a shortage of 20 pieces in another area (TK-AS201-27) as of December 10.

This follow-up problem in turn causes the system to propose a solution of issuing a purchase order for an additional 20 pieces on December 9, in order to make up the discrepancy. Knowledge of the user and/or information provided by the system, however, may reveal issuance of a new purchase order on such short notice, to be an unfeasible solution.

FIG. 4A also shows a second decision proposal that could potentially redress the issue. In particular, the lower branch of FIG. 4A shows a proposal to re-schedule existing product order (ProdOrd) 4913 from December 22 to December 19.

This decision in turn results in a changed state, namely a deficiency of the T-AS201 material in another area (TK-AS201-53). However, the interface shows that a follow-on decision could cure this problem.

In particular, FIG. 4A also shows a second decision proposal that could reschedule a purchase order (PurchOrder) 6003 from December 15, to an earlier date of December 12.

Figure 4B:
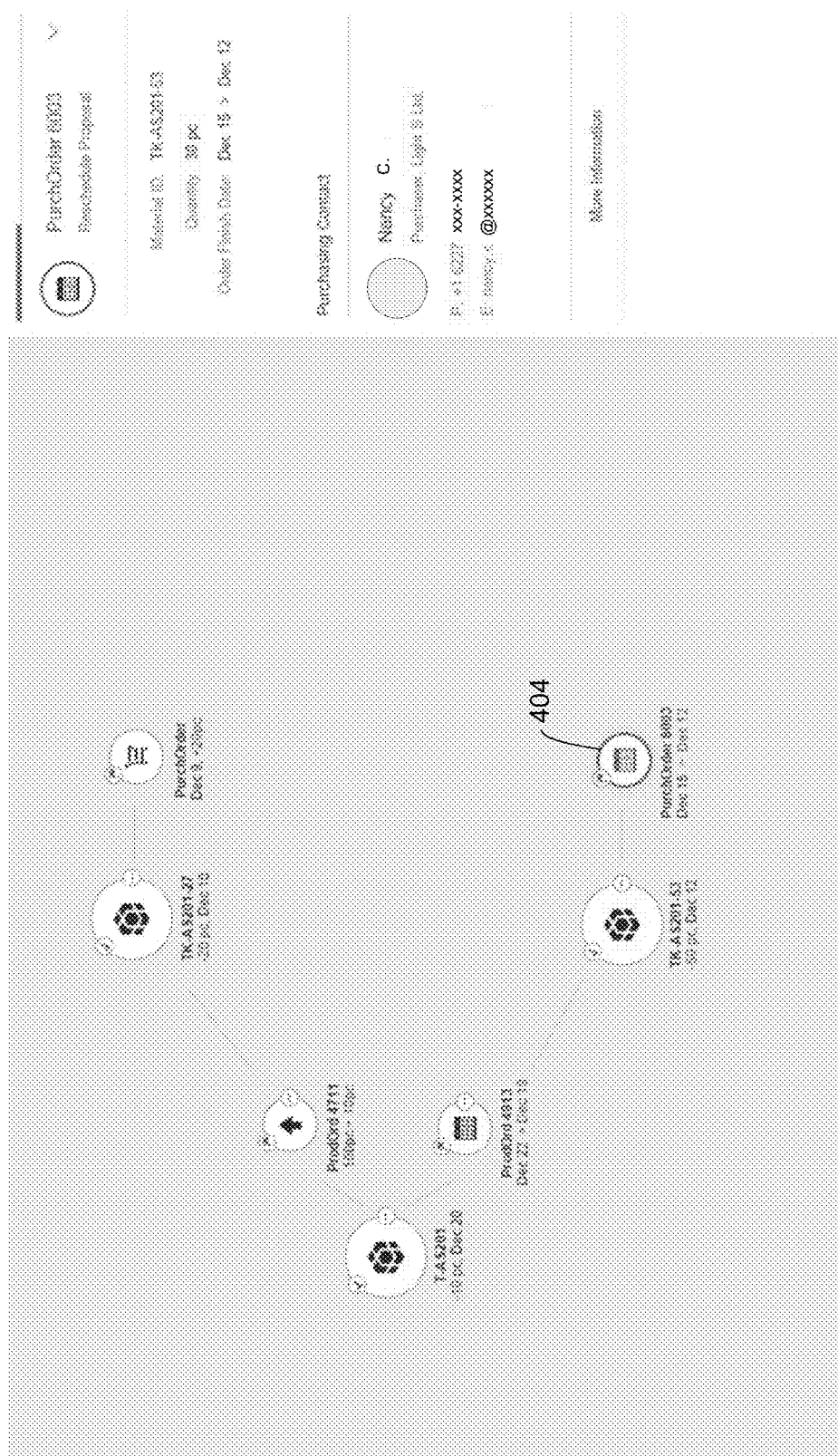

FIG. 4B is a screen shot of the interface showing additional details regarding this proposed solution. In particular, clicking on the circle 404 representing the PurchOrder 6003, results in contact information of the relevant purchasing agent (Nancy C.) to be shown in the side panel of the interface. Display of this information facilitates the ability of the user to reach out to Ms. C. in order to confirm/approve the feasibility of the concrete action, which is a part or a step in the overall solution path. Typically, a user must ensure the viability of the whole path before it is executed step-by-step.

The particular embodiment shown in FIGS. 4A-B, illustrates various alternatives that may be included. For example, icons may be useful in distinguishing different decision options. Thus a re-scheduling decision is indicated with a calendar icon, while a procurement decision is shown with a shopping cart.

Also, the shapes that are presented in tree form may include text/icons/features that are presented in various colors to indicate status, e.g., red designating a state not conforming to a desired target, and green text indicating a conforming state.

Figure 5:
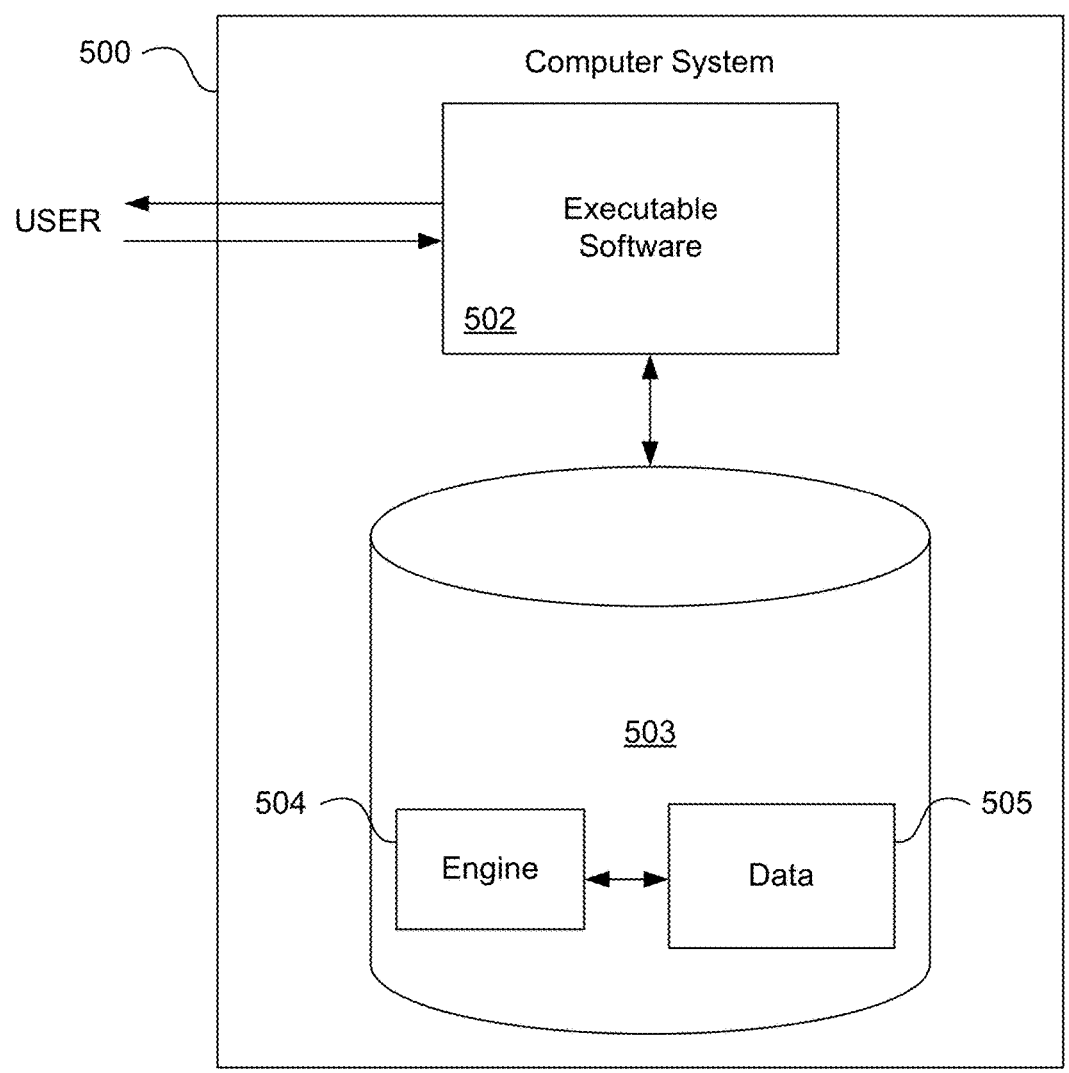
FIG. 5 illustrates hardware of a special purpose computing machine configured to provide decision support according to an embodiment.

FIG. 5 illustrates hardware of a special purpose computing machine configured to perform decision support according to an embodiment. In particular, computer system 501 comprises a processor 502 that is in electronic communication with a non-transitory computer-readable storage medium 503. This computer-readable storage medium has stored thereon code 505 corresponding to data reflecting entity states, relationships, and/or attributes. Code 504 corresponds to an engine. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

It is noted that in the specific embodiment of FIG. 5, the engine is shown as being part of the database. Such an embodiment can correspond to applications where processing is performed by a powerful engine available as part of an in-memory database (e.g., the HANA in-memory database available from SAP SE of Walldorf, Germany. However this is not required and in certain embodiments the engine may be implemented in other ways, for example as part of an overlying application layer.

Figure 6:
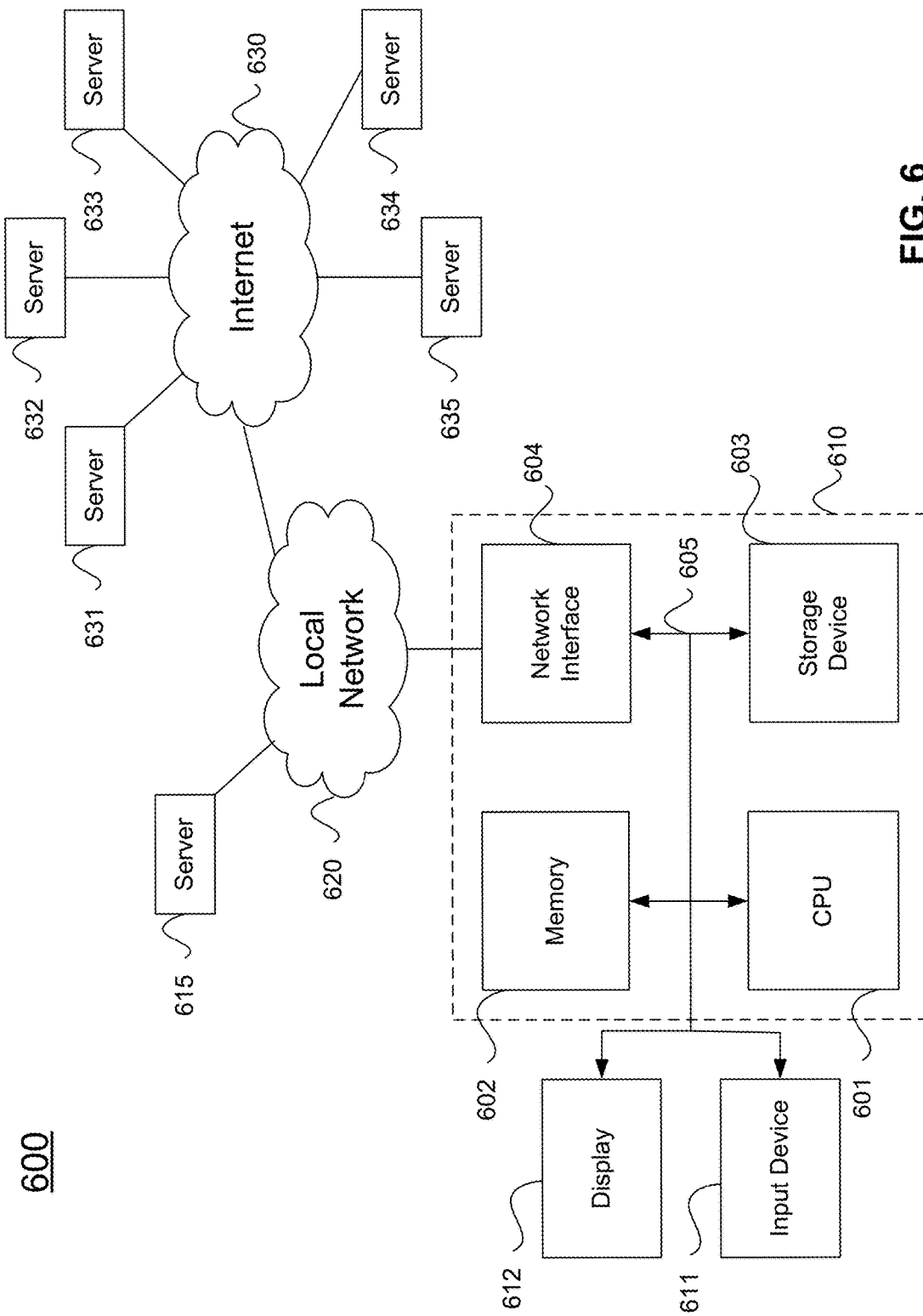
FIG. 6 illustrates an example of a computer system.

One example of a computer system 610 is illustrated in FIG. 6. Computer system 610 includes a bus 605 or other communication mechanism for communicating information, and a processor 601 coupled with bus 605 for processing information. Computer system 610 also includes a memory 602 coupled to bus 605 for storing information and instructions to be executed by processor 601, including information and instructions for performing the techniques described above, for example. This memory may also be used for storing variables or other intermediate information during execution of instructions to be executed by processor 601. Possible implementations of this memory may be, but are not limited to, random access memory (RAM), read only memory (ROM), or both. A storage device 603 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 603 may include source code, binary code, or software files for performing the techniques above, for example. Storage device and memory are both examples of computer readable mediums.

Computer system 610 may be coupled via bus 605 to a display 612, such as a cathode ray tube (CRT) or liquid crystal display (LCD), for displaying information to a computer user. An input device 611 such as a keyboard and/or mouse is coupled to bus 605 for communicating information and command selections from the user to processor 601. The combination of these components allows the user to communicate with the system. In some systems, bus 605 may be divided into multiple specialized buses.

Computer system 610 also includes a network interface 604 coupled with bus 605. Network interface 604 may provide two-way data communication between computer system 610 and the local network 620. The network interface 604 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 1104 sends and receives electrical, electromagnetic, or optical signals that carry digital data streams representing various types of information.

Computer system 610 can send and receive information, including messages or other interface actions, through the network interface 604 across a local network 620, an Intranet, or the Internet 630. For a local network, computer system 610 may communicate with a plurality of other computer machines, such as server 615. Accordingly, computer system 610 and server computer systems represented by server 615 may form a cloud computing network, which may be programmed with processes described herein. In the Internet example, software components or services may reside on multiple different computer systems 610 or servers 631-635 across the network. The processes described above may be implemented on one or more servers, for example. A server 631 may transmit actions or messages from one component, through Internet 630, local network 620, and network interface 604 to a component on computer system 610. The software components and processes described above may be implemented on any computer system and send and/or receive information across a network, for example.

The above description illustrates various embodiments along with examples of how certain aspects may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
providing an engine in communication with a database comprising state information of a first entity that is related to a second entity;
the engine displaying the state information of the first entity;
the engine displaying a decision relating to the first entity;
the engine receiving an input changing the state of the first entity, the input comprising selecting the decision;
the engine processing the input to change a state of the second entity while enforcing limited communication to not reference back to the database; and
the engine displaying the changed state of the second entity, wherein the state of the first entity, the decision, and the changed state of the second entity are displayed as nodes of a horizontal tree of the decision, wherein:
the state of the first entity is displayed in a first column;
the decision and an alternative decision are displayed in a second column to the right of the first column;
the changed state of the second entity and an updated state of the first entity are displayed in a third column to the right of the second column.

2. A method as in claim 1 further comprising displaying the decision with an icon.

3. A method as in claim 1 further comprising displaying details relevant to the decision in a panel.

4. A method as in claim 1 wherein the information is stored as a database data object comprising metadata including an attribute of the first entity.

5. A method as in claim 1 wherein the information is stored as a database data object comprising metadata including a relationship between the first entity and the second entity.

6. A non-transitory computer readable storage medium embodying a computer program for performing a method, said method comprising:
- an engine in communication with a database to display state information of a first entity that is related to a second entity;
- the engine displaying a decision relating to the first entity;
- the engine receiving an input changing the state information of the first entity, the input comprising selecting the decision;
- the engine processing the input to change a state of the second entity while enforcing limited communication to not reference back to the database; and
- the engine displaying the changed state of the second entity, wherein the state of the first entity, the decision, and the changed state of the second entity are displayed as nodes of a tree of the decision, wherein:
- the state of the first entity is displayed in a first column;
- the decision and an alternative decision are displayed in a second column to the right of the first column;
- the changed state of the second entity and an updated state of the first entity are displayed in a third column to the right of the second column.

7. A non-transitory computer readable storage medium as in claim 6 further comprising displaying the decision with an icon and/or with details relevant to the decision in a panel.

8. A non-transitory computer readable storage medium as in claim 6 wherein the information is stored as a data object comprising first metadata including an attribute of the first entity, and second metadata including a relationship between the first entity and the second entity.

9. A computer system comprising:
one or more processors;
a software program, executable on said one or more processors of the computer system, the software program configured to:
cause an engine to be in communication with a database to display state information of a first entity that is related to a second entity, the state information displayed as a first node of a horizontal tree;
cause the engine to receive an input changing the state of the first entity;
cause the engine to process the input to change a state of the second entity while enforcing limited communication to not reference back to the database; and
cause the engine to display the changed state of the second entity as a second node in a tree of the decision, wherein:
the software program is further configured to cause the engine to display a decision relating to the first node as a third node between the first node and the second node, and
the input comprises selecting the third node, wherein the software program is further configured to cause the engine to display:
the state of the first entity in a first column;
the decision and an alternative decision in a second column to the right of the first column;
the changed state of the second entity and an updated state of the first entity in a third column to the right of the second column.

10. A computer system as in claim 9 wherein the software program is further configured to cause the engine to display the decision with an icon and/or with details relevant to the decision in a panel.

11. A computer system as in claim 9 wherein the information is stored as a data object comprising first metadata including an attribute of the first entity, and second metadata including a relationship between the first entity and the second entity.

* * * * *